United States Defensive Publication [19] (H) [11] T101,803

Jones et al. [43] May 4, 1982

[54] PRODUCTION OF UREA-AMMONIUM SULFATE SUSPENSION FERTILIZER

[76] Inventors: Thomas M. Jones, 208 Stephenson Ct., Sheffield; Jeffrey L. Boles, 505-C Elder St., Florence, both of Ala. 35660

[21] Appl. No.: 287,399

[22] Filed: Jul. 27, 1981

[51] Int. Cl.[3] ..... C05C 9/00

[52] U.S. Cl. ..... 71/30; 71/64.9

[57] ABSTRACT

A process for production of highly concentrated nitrogen sulfur suspension fertilizers, with excellent long-term storage and handling properties, from ammonia, sulfuric acid, and urea. Satisfactory operation of the process and production of high-quality suspensions requires the use of a novel cooling procedure. For prevention of scale formation and production of small crystals, the product is cooled in two or more stages with gelling type clay added prior to or during crystallization and with air cooling used in the cooling stage(s) involving crystallization.

1 Claim, 1 Sheet Drawing,

19 Pages Specification

The file of this unexamined application may be inspected and copies thereof may be purchased (849 O.G. 1221, Apr. 9, 1968).

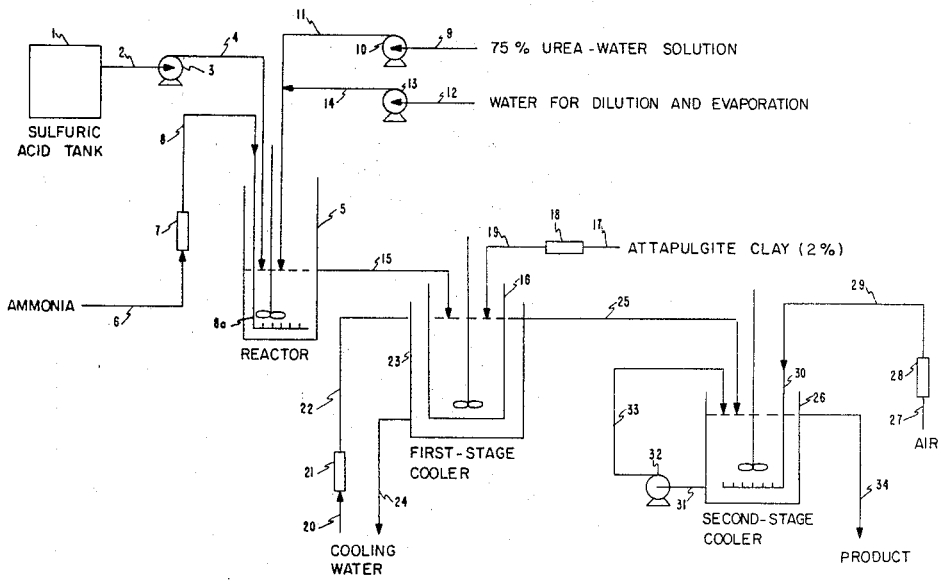

PRODUCTION OF UREA - AMMONIUM SULFATE SUSPENSION FERTILIZER USING A TWO-STAGE COOLING SYSTEM TO PREVENT SCALE FORMATION

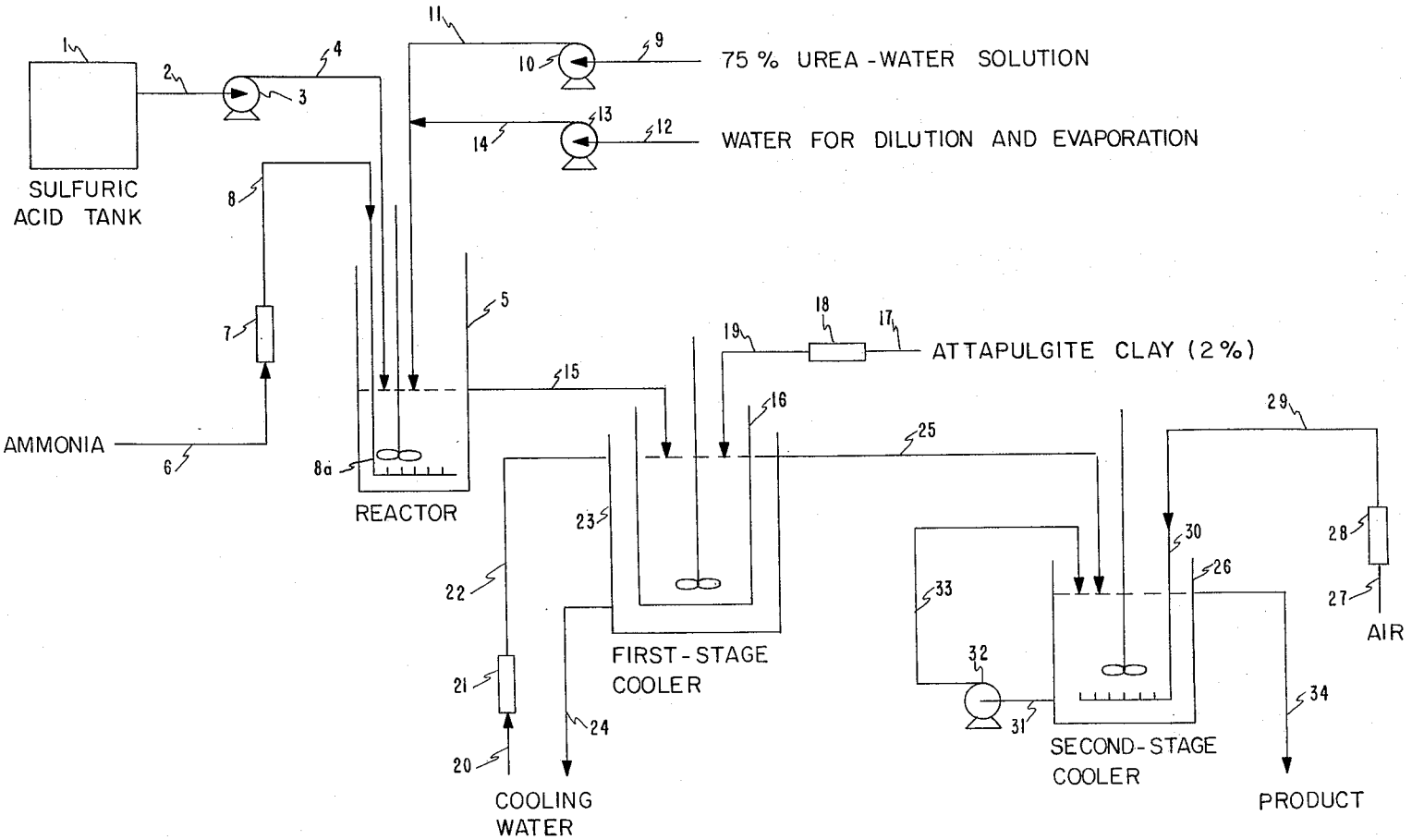
PRODUCTION OF UREA - AMMONIUM SULFATE SUSPENSION FERTILIZER USING A TWO-STAGE COOLING SYSTEM TO PREVENT SCALE FORMATION